United States Patent [19]

Katao

[11] 4,420,245
[45] Dec. 13, 1983

[54] ELECTROPHOTOGRAPHIC COPIER HAVING MOVABLE OPTICAL ELEMENTS FOR CHANGING THE MAGNIFICATION OF AN ORIGINAL DOCUMENT

[75] Inventor: Hisashi Katao, Hachioji, Japan

[73] Assignee: Olympus Optical Company Limited, Tokyo, Japan

[21] Appl. No.: 382,617

[22] Filed: May 27, 1982

[30] Foreign Application Priority Data

May 30, 1981 [JP] Japan .................................. 56-81850

[51] Int. Cl.³ .......................................... G03G 15/00
[52] U.S. Cl. ......................................... 355/11; 355/1; 355/57; 355/60
[58] Field of Search ..................... 355/11, 1, 65, 66, 8, 355/57, 60

[56] References Cited

U.S. PATENT DOCUMENTS 3,985,438 10/1976 Kurita .................................... 355/11
4,129,373 12/1978 Ogura et al. ............................ 355/1
4,370,055 1/1983 Nishikawa ........................... 355/1 X Primary Examiner—R. L. Moses
Attorney, Agent, or Firm—Fleit, Jacobson, Cohn & Price

[57] ABSTRACT

An electrophotographic copier for forming a copy of a document with a unit image magnification and a modified magnification, i.e. reduced or enlarged magnification is disclosed. A converging optical fiber array for forming a life-size image of a document is movably arranged with respect to an optical axis and reflection mirrors of a reduced-size image projecting optical system are secured to the converging optical fiber array so as to be moved together with the array. Remaining optical elements such as reflection mirrors and a projection lens are arranged fixedly. When the converging optical fiber array is brought into the optical axis, the life-size image of document is projected onto a photosensitive drum and when the converging optical fiber array is removed from the optical axis, the reflection mirrors of the reduced-size image projecting optical system are brought into the optical axis and the reduced image of document is projected onto the photosensitive drum.

7 Claims, 5 Drawing Figures

FIG_3
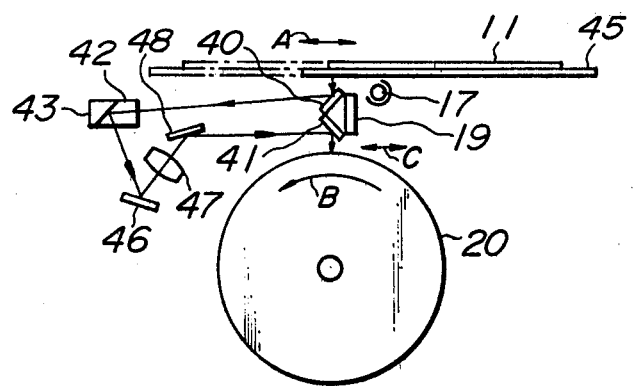
FIG_4
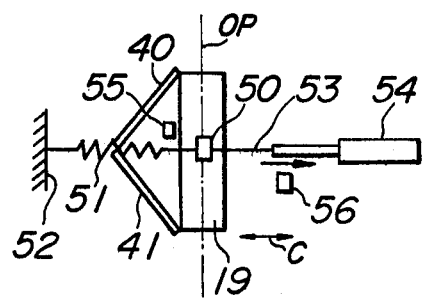

ELECTROPHOTOGRAPHIC COPIER HAVING MOVABLE OPTICAL ELEMENTS FOR CHANGING THE MAGNIFICATION OF AN ORIGINAL DOCUMENT

BACKGROUND OF THE INVENTION

The present invention relates to an electrophotographic copier which has a function of forming life-size copies of documents and of forming modified-size copies, i.e. enlarged or reduced copies of documents.

Various types of such electrophotographic copiers have been known and one of them is shown in FIG. 1. This known copier is of a type in which a traveling document is scanned by a slit type exposing optical system and an image of the document is projected onto a rotating photosensitive drum. A document 1 is placed on a document table 2 consisting of a transparent glass plate and the table 2 is reciprocally moved as shown by a double-headed arrow by means of a suitable driving mechanism not shown. Below the document table 2 is arranged a scanning optical system including an illumination lamp 3 enclosed by a concave reflection mirror 4, plane reflection mirrors 5, 6, 8 and 9 and a projection lens 7. Then an image of the document 1 is projected onto a photosensitive drum 10 by means of the mirrors 5 and 6, the projection lens 7 and the mirrors 8 and 9 to form an electrostatic latent image on the drum 10. The mirrors 5 and 6 and projection lens 7 are arranged movably between positions shown by solid lines and chain lines. When the mirrors 5 and 6 and projection lens 7 are driven in the solid line positions, life-size image of the document 1 is projected, whereas when they are moved into the chain line positions, an enlarged image of the document is projected onto the drum 10. In the known copier, since a plurality of elements such as the mirrors 5, 6 and projection lens 7 have to be moved over a relatively long distance, it is necessary to provide a rather complicated and large driving mechanism and a quite large space is required and thus, the whole construction of the copier is liable to be complicated in construction and large in size. Further, since the driving mechanism becomes large and heavy, there might be produced undesired noise and vibration and moreover, the movement could not be effected speedily.

SUMMARY OF THE INVENTION

The present invention has for its object to provide an electrophotographic copier in which a magnification for projecting a documdent image onto a photosensitive member can be changing by moving a minimum number of optical elements over a shortest distance and thus, a driving mechanism for moving the optical elements can be made simple in construction and small in size.

According to the invention, an electrophotographic copier for forming a copy of a document comprises means for traveling a document to be copied through an exposing position;

means arranged at the exposing position for iluminating the traveling document;

a life-size image projecting optical system having a converging optical fiber array which forms a life-size image of the illuminated document and being arranged movably between first and second positions with respect to an optical axis;

a modified-size image projecting optical system for forming a modified-size image of the illuminated document and having a plurality of optical elements at least one of which is secured to said converging optical fiber array, remaining optical elements being arranged fixedly;

means for moving said converging optical fiber array together with said at least one optical element of the modified-size image projecting optical system;

a photosensitive member arranged movably in synchronism with the traveling of the document for receiving either one of said life-size image and modified-size image of the document to form a corresponding electrostatic latent image;

and means for forming a duplicated copy with the aid of the latent image; whereby when said converging optical fiber array is in said first position, said life-size image is projected onto said photosensitive member, and when said converging optical fiber array is in said second position, said at least one optical element is in the optical axis to project the modified-size image of the document onto the photosensitive member.

BRIEF DESCRIPTION OF THE DRAWINGS

FIG. 3 is a schematic view illustrating another embodiment of the electrophotographic copier according to the invention; and FIG. 4 is a schematic view depicting an embodiment of an optical system changing mechanism according to the invention.

DESCRIPTION OF THE PREFERRED EMBODIMENTS

Figure 1:
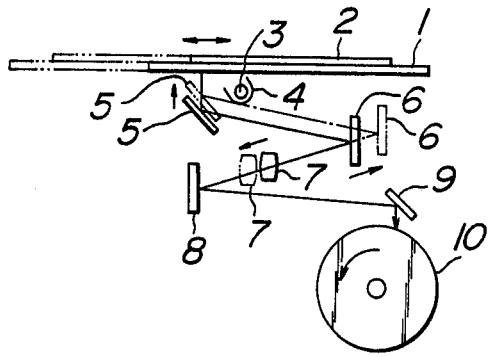
FIG. 1 is a schematic view showing a known electrophotographic copier having a function for changing a magnification or size of a duplicated image.
Figure 2A:
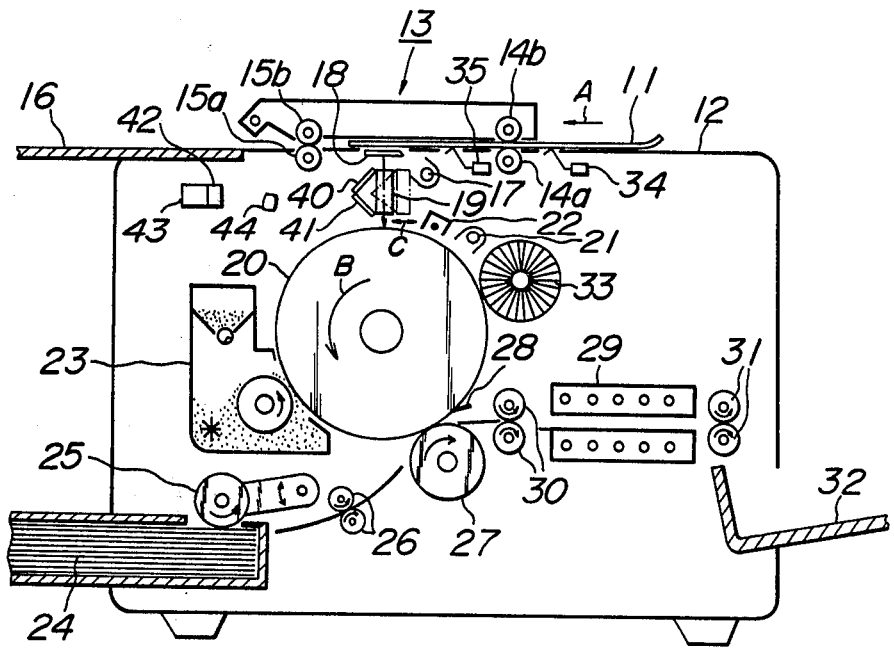
FIGS. 2a and 2b are schematic views showing an embodiment of the electrophotographic copier according to the invention.
Figure 2B:
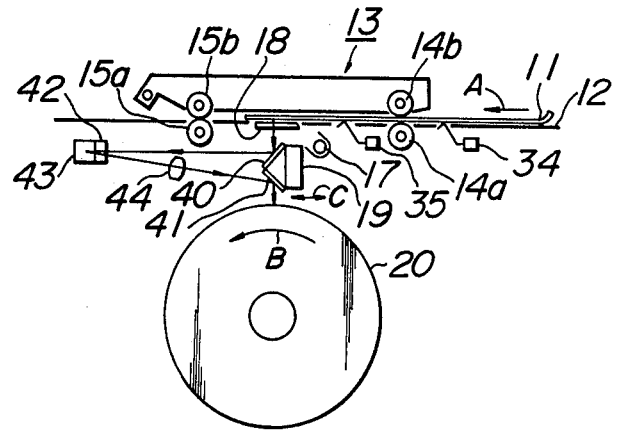

FIGS. 2a and 2b are schematic side views showing an embodiment of the electrophotographic copier according to the invention. When a sheet like document 11 is placed on a document table 12 and is inserted into a document feed apparatus 13 in a direction shown by an arrow A, the document is fed at a constant speed by means of feeding rollers 14a, 14b and 15a, 15b and is discharged on a document discharge table 16. During this feeding the document 11 is illuminated by a lamp 17 through a glass plate 18 and an image of the document 11 is projected by means of an optical system 19 comprising a converging optical fiber array onto a rotating photosensitive drum 20. The drum 20 is rotated at a constant speed in a direction shown by an arrow B. At first, any residual charge on the drum surface is erased by an erasing lamp 21 and then the drum surface is uniformly charged by a corona charger 22. When the uniformly charged drum surface is subjected to the imagewise exposure, an electrostatic latent image is formed on the drum surface. Then, the latent image is developed with toners by a developing device 23 of a magnetic brush type. Upon further rotation of the drum 20, the toned image is transported into a transfer section. Record papers 24 in a paper cassette are picked-up one by one by means of a swinging and rotating pick-up roller 25 and register rollers 26 and are successively supplied to the transfer section in which the record paper 24 is fed between the drum 20 and a semiconductive transfer roller 27 to which a suitable transfer bias potential is applied, and the toned image on the drum surface is transferred onto the record paper 24. In the transfer section, the record paper is intimately brought in contact with the drum surface. The record paper 24 is peeled off the drum 20 by means of a peeling claw 28 and is fed into a fixing device 29 by means of feeding rollers 30. The toned image is fused onto the record paper to form a final hard copy which is discharged by discharge rollers 31 onto a copy tray 32. The toner image on the drum 20 is not wholly transferred onto the record paper, but a part thereof remains on the drum. The residual toner particles on the drum 20 are removed by a rotating cleaning brush 33 and the removed toner particles are sucked by a fan and collected by a filter not shown. In order to initiate the operation of the copying machine and to control various portions thereof in response to the insertion of the document 11 into the document feed apparatus 13, microswitches 34 and 35 for detecting the document are provided along the document feed path.

The converging optical fiber array 19 has a magnitude of unity and thus, an image of the document 11 is projected onto the drum 20 with a unit magnification to obtain a lifesize copy. According to the invention, the converging optical fiber array 19 is arranged movably in a reciprocal manner as shown by an arrow C, so that the array 19 can be selectively inserted into an optical path. The copier further comprises an optical system for projecting a reduced image of the document, which system includes mirrors 40, 41, 42 and 43 and a projection lens 44. Among these elements of the modified-image projecting optical system, the mirrors 42 and 43 and the projection lens 44 are arranged fixedly, but the plane mirrors 40 and 41 are secured to the converging optical fiber array 19, so that the plane mirrors 40 and 41 are moved in the direction C together with the converging optical fiber array 19. In this case, when the converging optical fiber is removed out of the optical path, the plane mirrors 40 and 41 are just inserted in the optical path. Therefore, in the condition shown in FIG. 2b, the document image is first reflected by the mirror 40 toward the mirrors 42 and 43 arranged perpendicularly to each other. Then the document image is reflected by the mirrors 42 and 43 and is projected by the lens 44 via the mirror 41 onto the drum 20.

It should be noted that both the life-size image and the reduced image are made incident upon the photosensitive drum 20 at the same position. Therefore, the various control signals to be effected in synchronism with the rotation of the drum can be equally used both for the unit magnification duplicating mode and the modified magnification duplicating mode.

Further, according to the invention, since it is sufficient to move the converging optical fiber array 19 and the mirrors 40 and 41 over a short distance, a driving mechanism can be made extremely simple and small. For instance, the array 19 and mirrors 40 and 41 may be moved by means of a solenoid as will be explained later.

FIG. 3 is a schematic diagram illustrating another embodiment of the electrophotographic copier according to the invention. In this embodiment, similar portions as those of the previous embodiment are denoted by the same reference numerals as those used in FIGS. 2a and 2b. In the present embodiment a document 11 is placed on a transparent document table 45 which is reciprocally moved by a suitable driving mechanism as shown by an arrow A. In FIG. 3, a converging optical fiber array 19 is moved out of the optical axis and mirrors 40 and 41 secured to the array 19 are inserted into the optical axis to effect a copying operation with a reduced magnification. That is to say, when the document 11 is illuminated by a lamp 17, a light ray reflected by the document is reflected by the mirror 40 toward perpendicularly arranged mirrors 42, 43, and a mirror 46 and then is projected by a projection lens 47 via the mirrors 48 and 41 onto a photosensitive drum 20. In the previous embodiment shown in FIGS. 2a and 2b, since the projection lens 44 has to be arranged in a limited space and therefore, the lens 44 must have a smaller aperture. Contrary to this, in the embodiment illustrated in FIG. 3, since the projection lens 47 can be arranged in a large space, the lens can have a large aperture. Therefore, use may be made of the illumination lamp 17 of smaller output power.

FIG. 4 is a schematic view showing an embodiment of the mechanism for moving the converging optical fiber array 19 and the mirrors 40, 41 secured to the array. There is provided a projection 50 on a side surface of the array 19 and the projection 50 is connected to a fixed body 52 of the copier by means of a coiled spring 51. The projection 50 is further coupled with a plunger of a solenoid 54 via a rod 53. An assembly of the array 19 and mirrors 40, 41 is supported by a suitable guide so as to moved in the direction C. Therefore, when the solenoid 54 is deenergized, the assembly 19, 40, 41 is moved leftward by means of the spring 51 and the converging optical fiber array 19 serving as the life-size image projecting optical system is inserted in the optical path OP to effect the unit magnification copy. When the solenoid 54 is energized, the assembly 19, 40, 41 is moved rightward against the spring force and the mirrors 40, 41 forming a part of the reduced image projecting optical system are inserted into the optical path OP to effect the reduced magnification copy. There are further arranged stoppers 55 and 56 for defining the extreme positions of the assembly 19, 40, 41.

The present invention is not limited to the embodiments explained above, but many modifications and alternations may be conceived by those skilled in the art within the scope of the invention. For instance, the converging optical fiber array and mirrors secured thereto may be manually moved by operating a lever coupled with the array. Further it is preferable to change the rotation speed of the photosensitive drum in accordance with the magnification of projected image. Moreover, in the above embodiment, the reduced image of the document is projected when the converging optical fiber array is removed out of the optical axis, but it is a matter of course that an enlarged image of the document may be projected.

As explained above in detail, according to the invention, the magnification of the duplicated copy image can be changed by simply moving the converging optical fiber array of the life-size image projecting system and a part of the modified-size image projecting optical system secured thereto, over a relatively short distance. Therefore, it is possible to make the copier simpler in construction and smaller in size. Further, since the mechanism for moving the optical system can be also made small in size and light in weight, the life-size and modified-size image projecting optical systems can be exchanged with each other within a short time without producing undesired noise, vibration and shock.

What is claimed is:

1. An electrophotographic copier for forming a copy of a document comprising means for moving a document to be copied through an exposing position;

means arranged at the exposing position for illuminating the moving document;

a life-size image projecting optical system having a converging optical fiber array which forms a life-size image of the illuminated document and being arranged movably between first and second positions with respect to an optical axis;

a modified-size image projecting optical system for forming a modified-size image of the illuminated document and having a plurality of optical elements at least one of which is secured to said converging optical fiber array, remaining optical elements being arranged fixedly;

means for moving said converging optical fiber array together with said at least one optical element of the modified-size image projecting optical system;

a photosensitive member arranged movably in synchronism with the movement of the document for receiving either one of said life-size image and modified-size image of the document to form a corresponding electrostatic latent image; and means for forming a duplicated copy with the aid of the latent image; whereby when said converging optical fiber array is in said first position, said life-size image is projected onto said photosensitive member, and when said converging optical fiber array is in said second position, said at least one optical element is in the optical axis to project the modified-size image of the document onto the photosensitive member.

2. A copier according to claim 1, wherein said modified-size image projecting optical system comprises first and second plane mirrors secured to said converging optical fiber array, a reflecting device arranged fixedly for reflecting a light ray reflected by said first plane mirror toward said second plane mirror, and a projection lens arranged fixedly in an optical path between said first and second plane mirrors for projecting the modified-size image via said second plane mirror onto the photosensitive member.

3. A copier according to claim 2, wherein said reflection device comprises a pair of plane reflection mirrors arranged perpendicularly to each other.

4. A copier according to claim 1, wherein said modified-size image projecting optical system comprises first and second plane mirrors secured to said converging optical fiber array, a reflection device arranged fixedly for reflecting a light beam reflected by said first plane mirror toward a direction different from that to said second plane mirror, third and fourth plane mirrors arranged fixedly for reflecting the light beam emanating from said reflection device toward the second plane mirror and a projection lens arranged fixedly in an optical path between said third and fourth plane mirrors for projecting the modified-size image via said second plane mirror onto the photosensitive member.

5. A copier according to claim 4, wherein said reflection device comprises a pair of plane mirrors arranged perpendicularly to each other.

6. A copier according to any one of claims 1 to 5, wherein said means for moving the converging optical fiber array between said first and second positions comprises a coiled spring for pulling the converging optical fiber array into one of said first and second positions and a solenoid for moving the converging optical fiber array into the other position against a spring force of said coiled spring.

7. A copier according to any one of claims 1 to 5, wherein said means for moving the converging optical fiber array between said first and second positions comprises a lever for manually moving the array.

* * * * *